United States Patent

Rejeski et al.

[11] 4,010,518
[45] Mar. 8, 1977

[54] CLAMP FOR FLEXIBLE DUCT

[75] Inventors: William E. Rejeski, Farmington; Paul D'Aprile, Forestville, both of Conn.

[73] Assignee: The Wiremold Company, West Hartford, Conn.

[22] Filed: June 16, 1975

[21] Appl. No.: 587,357

[52] U.S. Cl. .................................. 24/73 C; 285/260
[51] Int. Cl.² ................................... A44B 21/00
[58] Field of Search .......... 24/73 C, 270; 285/260, 285/252, 420, 236

[56] References Cited

UNITED STATES PATENTS

| 475,589 | 5/1892 | Mills | 24/73 C |
|---|---|---|---|
| 2,046,589 | 7/1936 | Stader | 24/73 C |
| 2,234,656 | 3/1941 | Schmalz | 24/73 C |

*Primary Examiner*—Werner H. Schroeder
*Assistant Examiner*—Doris L. Troutman
*Attorney, Agent, or Firm*—Prutzman, Hayes, Kalb & Chilton

[57] ABSTRACT

A clamp assembly for flexible duct of a type having a helically wound strip and a form-sustaining helically wound reinforcing member secured between lapping adjacent wraps of the strip. For reducing an end convolution of the duct, a one-piece spring wire clamp is provided having an operating arm and a lever arm connected in offset angular relation, opposite ends of the operating arm being mounted at opposite ends of an end convolution of the reinforcing member of the duct. The lever arm is movable into a closed clamped position engaging the end of the duct for effecting movement of the operating arm to contract the end convolution of the duct.

11 Claims, 9 Drawing Figures

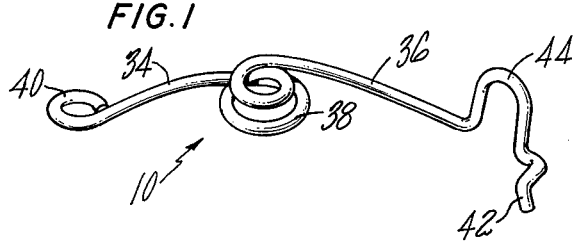
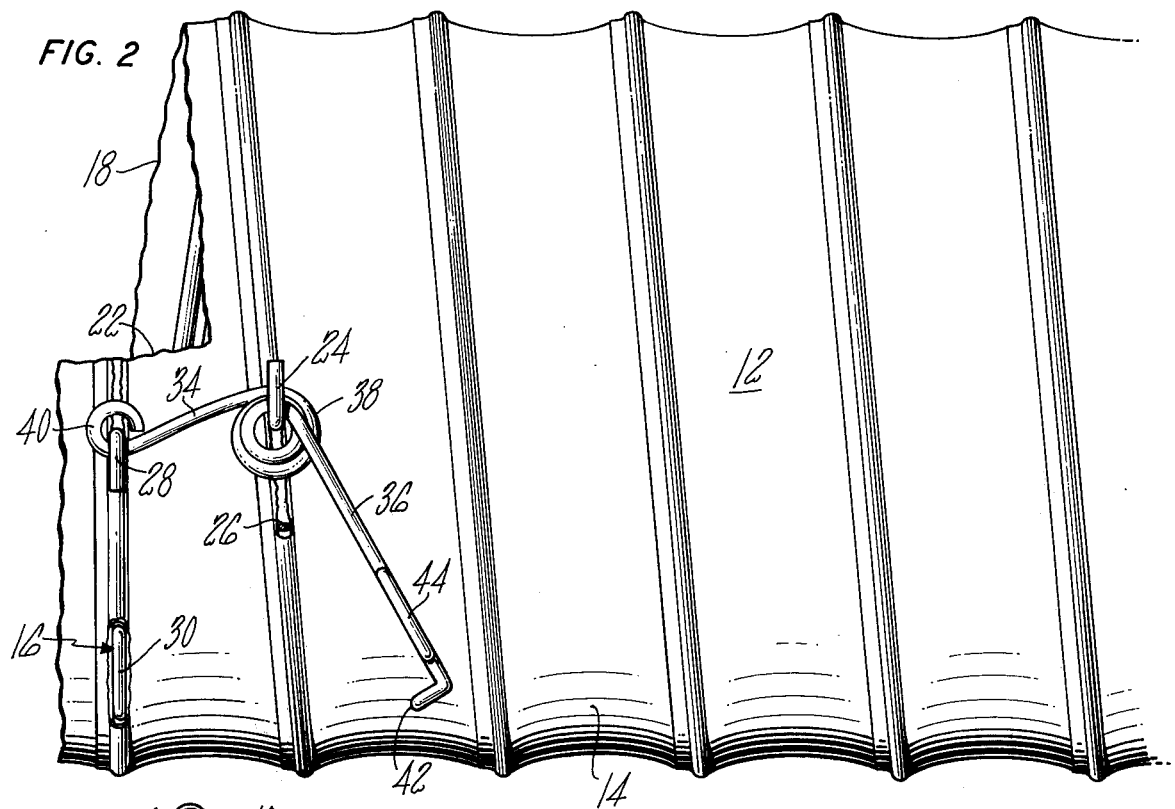
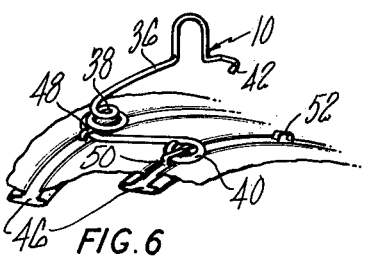
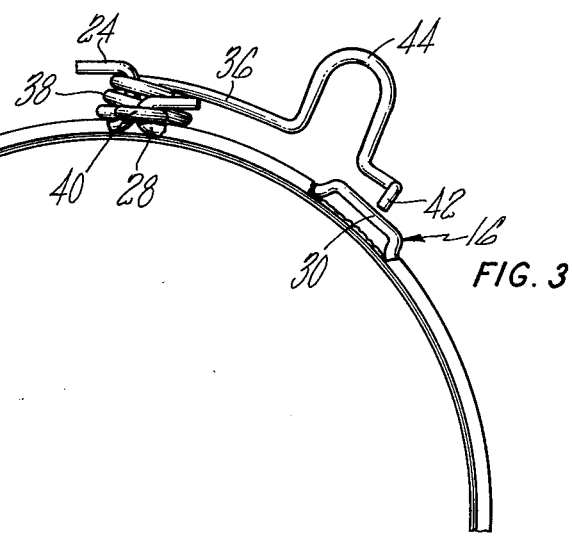

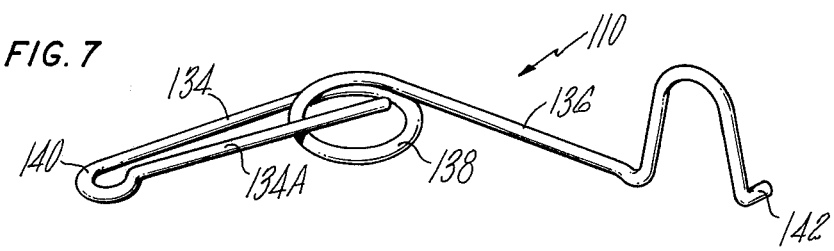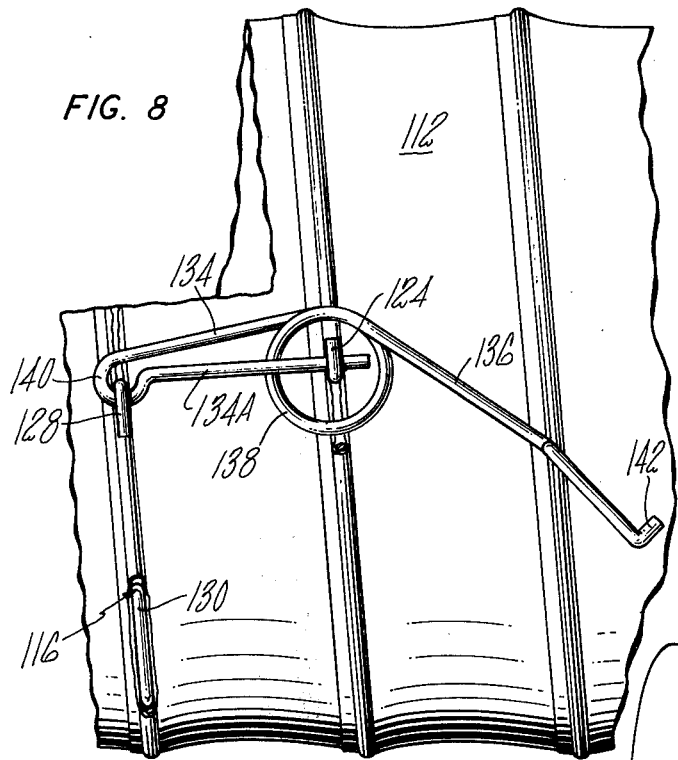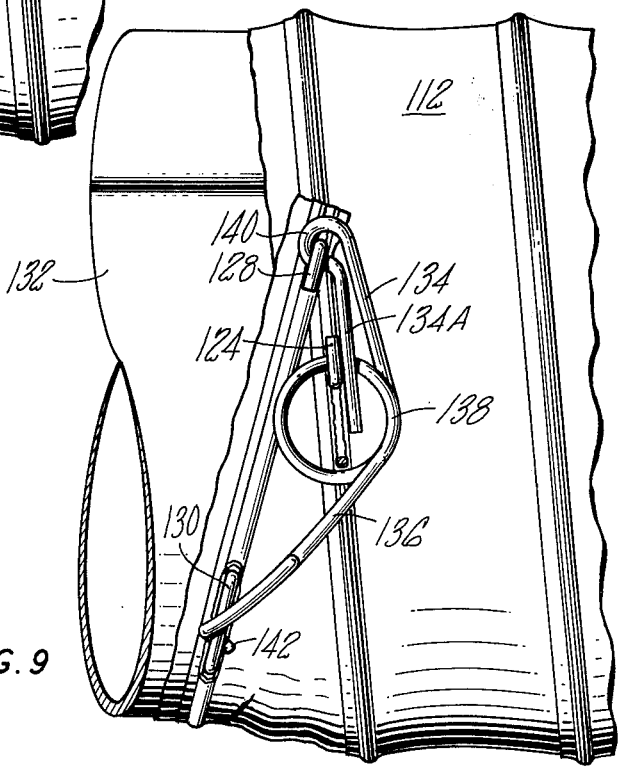

CLAMP FOR FLEXIBLE DUCT

This invention relates to clamps for securing flexible tubing or duct to adaptor flanges, conduits, tube ends and similar circular or elliptical conduits or connectors. More particularly, this invention concerns a clamp for securing an end convolution of duct having a flexible strip wound in helical overlapping wraps with a helically wound form-sustaining reinforcing member secured between the lapping adjacent wraps of the strip.

A primary object of this invention is to provide a new and improved clamp to be applied to an end convolution of flexible two-element duct and which is inexpensive to manufacture, quick and easy to secure to the duct and which can be readily released when desired.

Another object of this invention is to provide a clamp of the type described which is a one-piece member formed of resilient spring wire stock or similar wirelike material preformed to be easily attached to effectively contract an end convolution of duct about an inner conduit or similar connector.

A further object of this invention is to provide a duct clamping assembly having a minimum number of parts to secure an end convolution of a two-element type duct around a connector to which the duct is to be attached and which is readily assembled in a facile manner and may be shipped in assembly with the clamp in open released position without loss of parts.

Other objects will be in part obvious and in part pointed out more in detail hereinafter.

A better understanding of this invention will be obtained from the following detailed description and the accompanying drawings of illustrative applications of this invention.

In the drawings:

FIG. 1 is an isometric view of one embodiment of a clamp incorporating this invention;

FIG. 2 is a top plan view, partly broken away, showing an assembly of the clamp of FIG. 1 attached to a flexible duct with the clamp in open released position;

FIG. 3 is an end view, partly broken away, of the assembly of FIG. 2;

FIG. 6 is an isometric view, partly broken away, showing the clamp of FIG. 1 on a reduced scale with the clamp attached to a flexible duct of a type different from that illustrated in FIGS. 2–5;

FIG. 7 is an isometric view of another embodiment of a clamp incorporating this invention;

FIG. 8 is a top plan view, partly broken away, of an assembly wherein the clamp of FIG. 7 is attached to a flexible duct with the clamp in open released position; and FIG. 9 is a top plan view, partly broken away, showing the assembly of FIG. 8 in closed clamped position with an end convolution of the duct secured about a connector.

Figure 4:
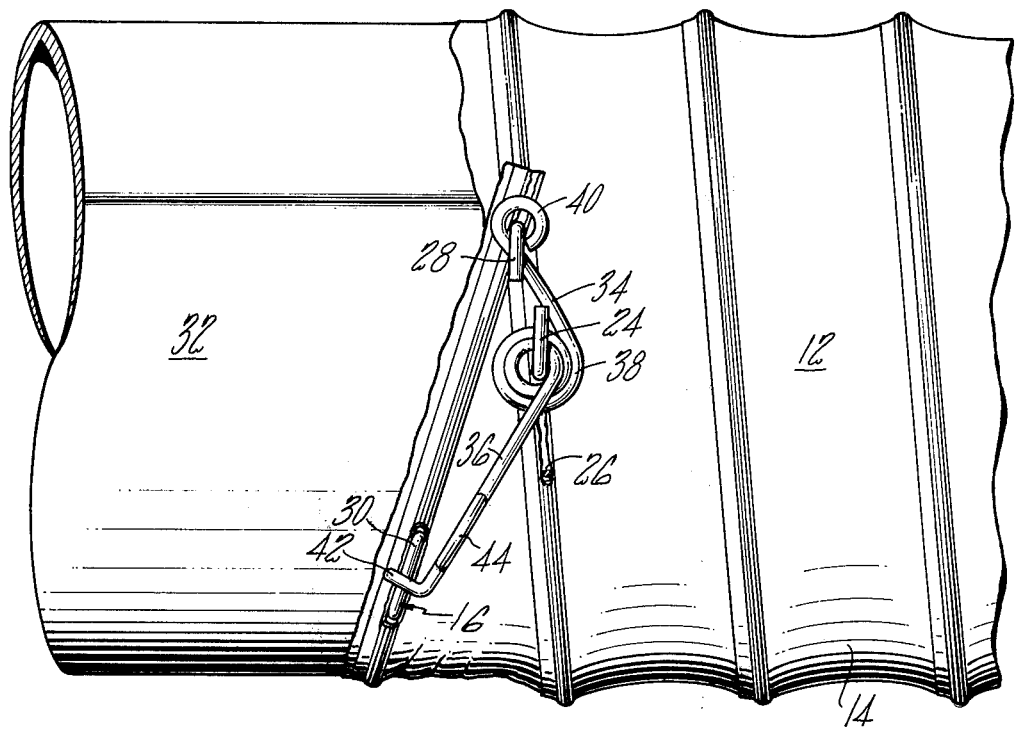
FIG. 4 is a top plan view similar to that of FIG. 2 showing the assembly in a closed clamped position with an end convolution of the duct secured about a connector.

Referring to the drawings in detail, this invention is described in connection with a flexible, two-element type tubular duct with which a clamp of the invention is particularly useful. The invention incorporates use of other flexible or collapsible conduit and tubing wherein it is required to secure an end of the tubing to another device such as a flange, pipe, connecting ring or similar connecting devices.

Figure 5:
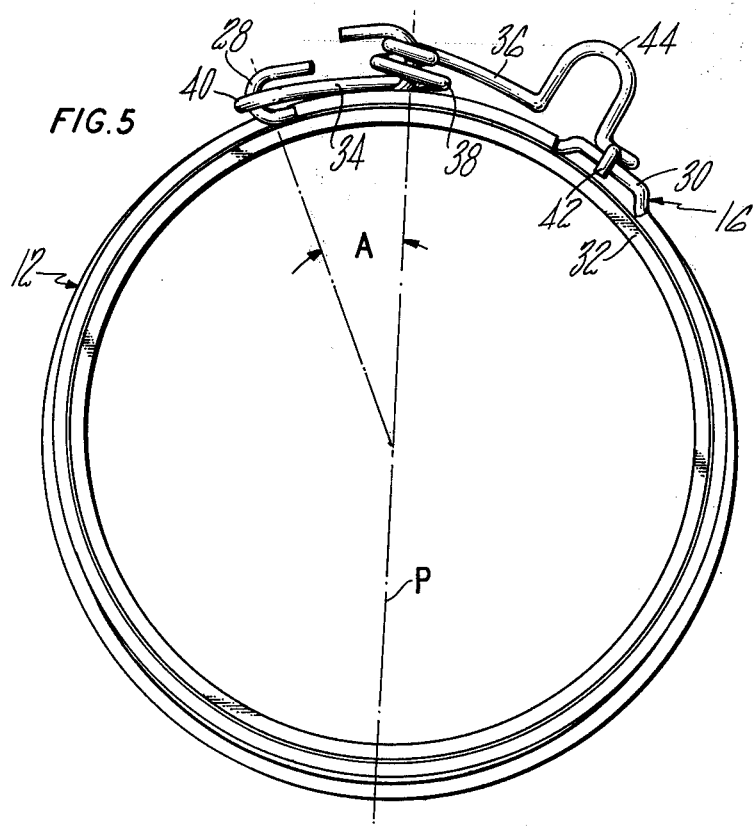
FIG. 5 is an end view of the assembly of FIG. 4.

One embodiment of a clamp 10 of this invention is shown in FIG. 1 and is illustrated in FIGS. 2–5 attached to flexible tubular duct 12. Duct 12 includes a helically wound flexible strip 14 which may be formed of a thin film plastic, non-woven material, fabric or similar strip material, and a helically wound form-sustaining reinforcing member 16 secured between lapping adjacent wraps of the strip 14. The reinforcing member 16 may be a wire or similar stock wound in a helical fashion as in FIG. 2 wherein the reinforcing member 16 serves to maintain the convolutions of the strip material in an extended tubular form.

In FIG. 2 the duct 12 is shown severed along a helical path 18 extending adjacent an end convolution 20 of the duct 12 with a terminal cut 22 extending generally axially of the duct 12. The beginning of an end convolution of the reinforcing member 16 is severed and turned radially outwardly and reversely bent to form a locking hook 24 adjacent the end 26 of the trailing convolution of the reinforcing member 16. Likewise, a free terminal end of the reinforcing member 16 is turned radially outwardly and reversely bent in a direction opposite that of severed end 24 to form a second locking hook 28. The strip material 14 which laps the reinforcing member adjacent the free terminal end 28 of the reinforcing member 16 is shown as being removed to expose a latch portion 30 of the reinforcing member 16 which is preferably formed in an inverted U-shaped configuration best seen in FIG. 3.

For clamping the end convolution 20 of duct 12 onto an inner concentric connector 32 (FIGS. 4 and 5), the one-piece clamp 10 is preferably made of spring wire stock or similar wirelike material which is rugged and resilient but capable of being bent and shaped to a desired form.

Clamp 10 comprises a continuous resilient wirelike body including an operating arm 34 and a lever arm 36 smoothly merging with opposite ends of a volute coil 38 intermediate the body. Coil 38 connects the operating and lever arms 34, 36 with the arms offset in obtuse angular relation to one another. Operating arm 34 projects tangentially from coil 38 to a clamping end 40 which is preformed with a full round hook which as seen in FIG. 2 is releasably engageable with the locking hook on the free terminal end 28 of the reinforcing member 16, the coil 38 being attachable to the locking hook 24 at the opposite end or beginning of the end convolution of the reinforcing member 16. Operating arm 34 is of a length sufficient to permit attachment of clamping hook 40 and the coil 38 to the opposite ends 28 and 24 of the end convolution of the reinforcing member 16 with the end convolution 20 of the duct 12 in an extended condition under the influence of its form-sustaining member 16.

The lever arm 36 is of a length greater than the length of the operating arm 34 and extends tangentially from an opposite end of the coil 38 to terminate in a turned free end 42. Free end 42 of the lever arm 36 is shown abruptly turned to serve as a linear latching hook. To provide a finger piece to facilitate manipulation of the lever arm 36, a projecting arcuate bend 44 if formed in the lever arm 36 adjacent its free latching end 42.

When the latching hook 42 of the lever arm 36 is in its open released position (FIGS. 2 and 3), the operating arm 34 projects generally axially of the duct 12 from the intermediate coil 38 to the clamping end 40 attached to the free terminal end 28 of the reinforcing member 16 with the centers of clamping hook 40 and the coil 38 substantially aligned axially of the duct 12. Upon manual deflection of the latching end 42 of clamp 10 from its open released position into closed clamped position (FIGS. 4 and 5), the latching end 42 of the lever arm 36 moves clockwise as viewed in the drawings to secure its free end in latching engagement with the exposed inverted U-shaped latch portion 30 of the reinforcing member. Such deflection of the clamp into closed clamped position effects swinging movement of the operating arm 34 into substantially parallel relation to the reinforcing member 16 adjacent the beginning of its end convolution to move the free terminal end 28 of the reinforcing member through angle A (FIG. 5) overcenter relative to the coil 38 and a longitudinally extending axial plane P containing the major axis of the duct 12, thereby to reduce the diameter of the end convolution 20 of the duct 12 and clamp it about connector 32.

It will be seen that the clamp coil 38 and hook 40 are formed with a radius of curvature and a diametrical size relative to the height and diameter of the locking hooks 24, 28 to minimize unintended displacement with the clamp 10 in unlocked assembly with duct 12.

While the embodiment of clamp 10 shown in FIG. 1 is illustrated in an assembly wherein the duct 12 in FIGS. 2–5 has a reinforcing member with the beginning of its end convolution severed as at 24, the clamp 10 has been found to be equally useful with tubing or duct having a form-sustaining reinforcing band such as illustrated at 46 of FIG. 6 wherein the reinforcing member is not readily severed or even deformable to provide suitable locking hooks or latch portions for attachment to the clamp 10. For operatively mounting the clamp 10 in assembly with such a duct, suitable heavy duty staples 48 and 50, e.g., may be manually secured to corresponding points on the adjacent end convolutions of the duct for attachment of the coil 38 and clamping hook 40 of the operating arm 34. A third staple 52 is illustrated in FIG. 6 which serves to engage the latching end 42 of the lever arm 36 when the lever arm is moved from its illustrated open released position into closed clamped position to effect clamping of the duct as described above in the embodiment of FIGS. 2–5.

Turning now to that embodiment of this invention illustrated in FIGS. 7–9, the same numbers increased by 100 are used to refer to like parts of the duct clamp and assembly as those used in connection with the previously described embodiment shown in FIGS. 2–5. Clamp 110 of FIG. 7 will be understood to be formed of a suitable spring wire material and functions in substantially the same manner as the clamp 10 of FIG. 1.

To ensure self-locking whereby clamp 110 is releasably secured to duct 112 to prevent inadvertent disassembly even with clamp 110 in open released position (FIG. 8), e.g., during shipment or installation of the duct 112, operating arm 134 is reversely bent at its extremity relative to the coil 138 to provide a self-locking extension 134A which projects from clamping hook 140 toward coil 138 and has a length sufficient to extend diametrically beyond the center of coil 138. Accordingly, clamping hook 140 engages with locking hook 128 at the free terminal end of the reinforcing member 116, and the self-locking extension 134A is slightly compressed during assembly to fit the coil 138 over the locking hook 124 at the beginning of the end convolution of the reinforcing member with the self-locking extension 134A located below the locking hook 124. Upon release, the self-locking extension 134A assumes a position illustrated in FIG. 8 to bear against the hook 124. The hook 124 is preferably dimensioned and configured relative to the coil 138 and extension 134A such that the latter portions of clamp 110 are in interfering relation to the locking hook 124 with the clamp in its open released position of FIG. 8 to effectively prevent inadvertent disassembly once the clamp is attached to the duct 112 in unlocked assembly.

Accordingly, this clamp construction tends to prevent undesired disassembly of the clamp 110 in open released position from the duct even though the lever arm 136 may be moved in either of two angular directions.

Upon manipulation of the clamp 110 into the closed clamped position illustrated in FIG. 9 wherein latching end 142 of lever arm 136 is engaged with exposed latch portion 130 of the reinforcing member 116 adjacent the free terminal end 128 of its end convolution, self-locking extension 134A of the operating arm swings into a position intermediate the locking hook 124, at the beginning of the end convolution of the reinforcing member 116, and the operating arm 134 projecting outwardly from the coil 138. The coil 138 and the clamping hook 140 of the operating arm 134 accordingly firmly secure the hooks 124 and 128 on the end convolution of the reinforcing member to maintain it in a contracted state relative to connector 132 about which the end of the duct 112 is secured.

By virtue of the flexible duct clamp and assembly of this invention, the body of the clamp is readily formed at minimum expense to provide a clamp having the desired configuration and which is resilient and rugged to effectively apply and maintain a desired hoop tension on an end of the duct about its connector when the assembly is in closed clamped position. Moreover, the simplified one-piece construction of the clamp enables a workman to quickly and easily effect releasable attachment to the duct and to clamp the duct to a connector with a minimum amount of skill and effort in determining the proper points of attachment for effective clamping of the duct without risk of losing parts of the clamp. Moreover, unlike conventional clamps of this general type, there is a minimum of time wasted during assembly as frequently encountered by a lack of precise positioning of the clamp relative to the duct to cause the desired contraction of its end convolution. The ease of assembly of the described clamp is further enhanced by the described clamp construction which is particularly suited for minor modification, e.g., to reduce the effective lengths of the operating arm and the lever arm in those instances where adjustment may be required, for the arms of the clamp may be bent and deformed to suit a particular application requiring such minor adjustment.

As will be apparent to persons skilled in the art, various modifications, adaptations and variations of the foregoing specific disclosure can be made without departing from the teachings of this invention.

We claim:

1. For contracting and securing an end of a generally tubular flexible duct having a helically wound reinforcing member maintaining the duct in a normally extended condition, a spring clamp comprising a continuous resilient wirelike body including an operating arm and a lever arm in offset angular relation to one another, an intermediate coil connecting the operating arm and the lever arm, the operating arm being reversely bent at its extremity relative to the coil to provide a self-locking extension of the operating arm projecting toward the coil, the self-locking extension of the operating arm having a length sufficient to extend diametrically beyond the center of the coil, and the lever arm having a length greater than the length of the operating arm whereby with the operating arm attached to opposite ends of an end convolution of the reinforcing member, deflection of the lever arm into engagement with the end of the duct reduces the duct diameter.

2. The clamp of claim 1 wherein the free end of the lever arm is abruptly turned to provide a linear latching hook.

3. The clamp of claim 1 wherein the body is formed of spring wire stock which is deformable for modifying the effective lengths of the operating arm and the lever arm.

4. A duct clamping assembly comprising a generally tubular flexible duct having a helically wound flexible strip and a helically wound form-sustaining reinforcing member secured between lapping adjacent wraps of the strip, the reinforcing member including an end convolution having a first end and an opposite free end, first and second clamp mounting means secured to the reinforcing member adjacent its first end and opposite free end respectively, and clamp latching means secured to the reinforcing member in adjacent trailing relation to the second clamp mounting means, and a one-piece spring clamp for reducing the diameter of the end convolution, the clamp having a continuous resilient wire-like body with an operating arm and a lever arm in offset angular relation to one another, the clamp body having an intermediate portion connecting the operating arm and the lever arm, the intermediate portion of the clamp body being mounted on the first clamp mounting means, the operating arm having a clamping end attachable to the second clamp mounting means, and the lever arm having a latching end movable between an open released position and a closed clamped position wherein the latching end is engageable with the clamp latching means.

5. The assembly of claim 4 wherein the operating arm projects axially of the duct from said intermediate portion of the clamp to its clamping end attached to said second clamp mounting means when the latching end of the clamp is in open released position, and wherein deflection of the latching end of the clamp into closed clamped position effects swinging movement of the operating arm into substantially parallel relation to the reinforcing member adjacent said beginning of its end convolution to contract the same.

6. The assembly of claim 4 wherein said intermediate portion of the clamp comprises a coil, wherein the coil and the operating arm are mounted on the duct in substantially alignment with a longitudinally extending axial plane containing the major axis of the duct when the latching end of the lever arm is in open released position, and wherein deflection of the lever arm to move its latching end from open to closed positions causes the operating arm to move the free end of the reinforcing member overcenter relative to the coil and to said axial plane to contract the end convolution of the duct upon movement of the latching end of the lever arm into closed clamped position.

7. The assembly of claim 4 wherein, said intermediate portion of the clamp comprises a coil, wherein the end convolution of the reinforcing member is severed from its adjacent trailing convolution, and wherein the coil of the clamp and the clamping end of the operating arm are engaged with the first and second clamp mounting means respectively disposed on the severed end of the adjacent trailing convolution and the free end of the end convolution of the reinforcing member.

8. The assembly of claim 7 wherein said severed end and free end of the reinforcing member are turned radially outwardly relative to the duct and are reversely bent to provide said first and second clamp mounting means defining locking hooks projecting in opposite directions relative to one another for attachment, respectively, to the coil of the clamp and the clamping end of the operating arm.

9. The assembly of claim 8 wherein the operating arm is reversely bent at its clamping end to form an extension of the operating arm projecting toward the coil a distance sufficient to extend diametrically of the coil beyond its center to effect self-locking of the clamp relative to the locking hook at the severed end of the reinforcing member when the latching end of the clamp is in open released position.

10. The assembly of claim 4 wherein the reinforcing member has an exposed portion bent radially outwardly in adjacent spaced relation to its free end, the exposed portion of the reinforcing member being of inverted U-shaped configuration and defining said clamp latching means for releasable engagement with said latching end of the lever arm in said closed clamped position.

11. The assembly of claim 10 wherein the end convolution of the reinforcing member is severed from its adjacent trailing convolution, and wherein said intermediate portion of the clamp and the clamping end of the operating arm are engaged with the first and second clamp mounting means respectively disposed on the severed end of the adjacent trailing convolution and the free end of the end convolution of the reinforcing member.

* * * * *